United States Patent
Huang

(10) Patent No.: US 11,151,867 B2
(45) Date of Patent: Oct. 19, 2021

(54) TRAFFIC CONDITION SYSTEM FOR INTERNET OF VEHICLES BASED ON IMAGE RECOGNITION

(71) Applicant: Shang Huang, Taoyuan (TW)

(72) Inventor: Shang Huang, Taoyuan (TW)

( * ) Notice: Subject to any disclaimer, the term of this patent is extended or adjusted under 35 U.S.C. 154(b) by 93 days.

(21) Appl. No.: 16/736,817

(22) Filed: Jan. 8, 2020

(65) Prior Publication Data
US 2021/0150895 A1    May 20, 2021

(30) Foreign Application Priority Data

Nov. 14, 2019    (TW) ................................ 108141395

(51) Int. Cl.
| | |
|---|---|
| *G08G 1/01* | (2006.01) |
| *H04W 4/44* | (2018.01) |
| *G06K 9/00* | (2006.01) |
| *G08G 1/04* | (2006.01) |
| *G01S 19/42* | (2010.01) |
| *B60Q 9/00* | (2006.01) |

(52) U.S. Cl.
CPC ....... *G08G 1/0141* (2013.01); *G06K 9/00805* (2013.01); *G08G 1/0112* (2013.01); *G08G 1/0133* (2013.01); *G08G 1/04* (2013.01); *H04W 4/44* (2018.02); *B60Q 9/00* (2013.01); *G01S 19/42* (2013.01)

(58) Field of Classification Search
CPC .. G08G 1/0141; G08G 1/0133; G08G 1/0112; G08G 1/04; H04W 4/44; G06K 9/00805; G01S 19/42; B60Q 9/00
See application file for complete search history.

(56) References Cited

U.S. PATENT DOCUMENTS

| | | | | |
|---|---|---|---|---|
| 9,918,001 | B2 * | 3/2018 | Pisz | G08G 1/09675 |
| 2004/0252192 | A1 * | 12/2004 | Adachi | H04N 7/18 348/148 |
| 2011/0095908 | A1 * | 4/2011 | Nadeem | B60H 3/00 340/905 |
| 2012/0158275 | A1 * | 6/2012 | Huang | G08G 1/0133 701/119 |
| 2013/0124073 | A1 * | 5/2013 | Ren | G08G 1/0112 701/118 |

(Continued)

*Primary Examiner* — Hongmin Fan
(74) *Attorney, Agent, or Firm* — Lin & Associates IP, Inc.

(57) ABSTRACT

The invention discloses a traffic condition system for Internet of vehicles based on image recognition, comprising a plurality of in-vehicle devices and a backend platform; using edge computing to carry out the traffic condition identification in the image by each in-vehicle device. Each in-vehicle device captures images and analyzes the images to obtain the traffic condition information on the road. The information is divided into static easily-detectable information, dynamic easily-detectable information and static not-easily-detectable information and filed to the backend platform via wireless transmission. The backend platform is to verify the validity of the traffic condition information by means of cross-validation mechanism and supplemented by the dynamic prediction mechanism, to establish a traffic condition map and transmit the traffic condition information to each in-vehicle device according to the position of each driver for the attention, so as to form a low-bandwidth, automated traffic condition system for Internet of vehicles.

19 Claims, 7 Drawing Sheets

(56) References Cited

U.S. PATENT DOCUMENTS

2016/0080163 A1\* 3/2016 Taylor .................... H04W 4/02
 370/312
2016/0293000 A1\* 10/2016 Torgerson ............... H04W 4/14

\* cited by examiner

TRAFFIC CONDITION SYSTEM FOR INTERNET OF VEHICLES BASED ON IMAGE RECOGNITION

TECHNICAL FIELD

The technical field generally relates to a traffic condition system for Internet of vehicles based on image recognition.

BACKGROUND

As the various automotive electronic devices gain popularity, more and more electronic devices are employed to assist drivers. For example, the satellite navigation system is commonly adopted, wherein the global positioning system (GPS) and map information system are coordinated to guide a driver via speech to follow a path shown on the map to reach a destination. In addition, more and more vehicles are also equipped with a plurality of cameras and sensing devices, and use software-based applications to achieve more advanced functions, such as, collision warning, automatic parking, and even automatic driving. However, the information on traffic conditions on the road are difficult to detect, gather or predict, so the traditional radio broadcast method is still a popular source of information for many drivers to stay informed of the traffic conditions.

In general, when driving, a driver mainly relies on the visual information to identify the traffic conditions that the driver can see in order to make appropriate driving decisions. To facilitate the analysis, the traffic information to the driver can be generally divided into three categories: the first type is easily-detectable information, which lies within the driver's visible range, and the driver can directly use in making decisions during driving. For example, the vehicle in front, the distance from the vehicle in front, etc. can be categorized as the first type traffic condition information. The second type is not-easily-detectable information, which lies within the driver's visible range, but the driver does not know exactly what the traffic condition information means, so that the driver cannot use the traffic condition information directly when making driving decisions, for example, the driver cannot predict whether the bus in front is about to change lanes, turn right or left, and so on. The third type is non-detectable information, which is the traffic condition information not within the driver's visual range, such as, a reduced lane due to road construction 500 meters ahead. In addition, these types of information can be further divided into dynamic information and static information, which indicates whether the location of the traffic condition will change with time. For example, road construction and accidents are considered as static information, and bicycles on the road, sweeper vehicles on highway, and the location of emergency vehicles (such as ambulances, fire engines) are considered as dynamic information.

The operation of existing warning systems, such as Collision Warning with Full Auto Brake (CWFAB), Automatic Collision Avoidance System (ACAS), Blind Spot Information System (BSIS) and Lane Keeping Assistance System (LKAS) and other systems, is usually through the induction and automatic control methods to prevent drivers from being inattentive to the surrounding traffic conditions. Similarly, the technology disclosed in Patent Application 105134417 is also based on the warning scheme proposed to prevent drivers from being distracted and not paying attention to the surrounding traffic conditions, leading to potentially compromised driving safety. In other words, all of these warning systems provide the first type of easily detectable information mentioned above. However, for a cautious driver who is qualified and safety-conscious, the safety benefits of easily detectable information provided by these technologies or devices are relatively limited when the driver makes driving decisions.

In the current driving environment, the provision of the aforementioned second type of not-easily-detectable information mostly relies on other drivers. For example, the driver of the car in front is required to use turn signals to warn the driver of the car behind about an upcoming lane change. The warned driver receives the not-easily-detectable information. Taking a turning vehicle as an example, if the driver in front behaves badly and does not use the turn signal properly, or the turn signal cannot clearly indicate the intention to turn, then the driver behind is put in danger. Although the technology disclosed in Patent Application 104126916 may prompt the driver to pay special attention to the driving style ahead, the disclosure does not provide clear not-easily-detectable information.

As for the third type of non-detectable information, i.e., not within the driver's visible range, the provision and transmission of traffic condition information must rely on the third parties (i.e., other drivers, passersby, construction units, and so on). The participants in the information flow include information providers and information transmitters. For example, the aforementioned radio stations, such as the police radio station or the traffic radio station, are information transmitters. In contrast, the good Samarians who report traffic accidents and traffic conditions through telephone are the information providers. However, the information circulation or reporting method of this type suffers the following disadvantages. The first is the use of manpower as the information provider, which are prone to delays or errors in the information reporting, such as delayed notification, lack of precise location, and so on; and the second is the information transmitting party are not actively seeking out to collect information, and the broadcast usually reads through a long list of indistinguishable information, which can also inevitably reduce the efficiency of information transmission and reception.

Furthermore, as mentioned earlier, thanks to technology advancement, there are also many devices or applications, such as Garmin Connect and Waze, that act as active information transmitters, which can filter all traffic information by location and only warn drivers of those that are location-relevant to the driver's whereabouts. These devices, combined with the technology disclosed in Patent Application 106121909, can indeed provide effective early warning, and yet still cannot overcome the problems caused by using manpower as the information provider.

In addition, in the technology disclosed in Patent Application 104128876, the driving scenes are uploaded immediately and received by the vehicle behind, so that the driver behind can directly sees the scenes ahead of the vehicle in front. However, the video streaming of this technical solution will consume a large amount of bandwidth, and the visual device used in the disclosure is itself a distraction to the driver. Therefore, the potential danger of traffic accidents due to distraction should not be overlooked.

Moreover, the technology disclosed in Patent Application 100146222 is to analyze the sensed driving dynamics data to identify specific traffic conditions, and then wirelessly transmit to a background database for data integration and update for warning location-relevant traffic conditions. However, the disclosed technology does not provide detailed information on traffic conditions. The main reason is that the driving dynamics analyzed by the technology are the response of the driver due to an event ahead, such as braking due to traffic ahead, lane change due to road construction on the lane, and so on, and analysis of the response cannot deduce the exact traffic condition information. For example, the cause of lane change may be road construction, or as a result of a misbehaving bicyclist or pedestrian. Therefore, the analysis on driving dynamics information of the vehicle alone cannot determine the traffic conditions that cause the driving dynamics, and thus fails to warn the driver of the exact traffic information. In particular, when facing dynamic traffic conditions, such as dogs or wild animals crossing the highway by accident, the response of the driver will also change accordingly, such as the position of the dogs, which further limits the recognition of traffic conditions. Moreover, because the same vehicle cannot repeatedly identify the same event in the disclosed technology, it relies on multiple vehicles to repeatedly verify the information obtained, which also reduces the system efficiency, fails to provide ample traffic condition information, and is difficult to promote development.

With the gradual development of the Internet of Things technology, the same concept can also be applied to the construction of a traffic condition network of vehicles through decentralized deployment, for example, using intersection surveillance cameras as detection sources for traffic or traffic condition information; however, this approach of "fixed source" traffic or traffic condition network can only obtain relatively sparse traffic condition information from relatively sparse sources, and cannot achieve the key principle of obtaining dense information from sparse sources to become an effective real-time system sharing traffic conditions information. The main reason lies in the fixed source of traffic condition information is, no matter how dense and extensive the deployment is, inferior to obtaining dense information through the moving source of traffic condition information, namely, the vehicles on the road. At present, none of the technologies available in the market can meet this critical requirement. Therefore, although conceptually attractive, the conventional technology has yet to come up with actual technology to achieve the goal of effective traffic conditions for Internet of vehicles.

SUMMARY

In view of the shortcomings of the above-mentioned conventional technologies, the primary object of the present invention is to provide a traffic condition system for Internet of vehicles based on image recognition, to obtain dense information by moving sources of the traffic condition information to achieve the key principle of obtaining dense information from sparse sources.

Another object of the present invention is to provide a traffic condition system for Internet of vehicles based on image recognition, which includes at least an in-vehicle device and a backend platform. The system utilizes the edge computing to delegate the tasks of recognizing the traffic condition in the captured traffic images to each in-vehicle device; that is, each in-vehicle device captures traffic images, analyzes the traffic conditions information in the images, and divides the information into static easily-detectable information, dynamic easily-detectable information and static not-easily-detectable information, and wirelessly submitting to the backend platform. The main function of the backend platform is to use a cross-validation mechanism to confirm the validity of the traffic condition information, and then assisted with a dynamic prediction mechanism to construct a traffic condition map and transmit the traffic condition information to each in-vehicle device according to the position of the driver to remind each driver, thereby forming a low-bandwidth, automated Internet of vehicles.

Yet another object of the present invention is to provide a traffic condition system for Internet of vehicles based on image recognition, which includes a backend platform, and the cross-validation mechanism of the backend platform can confirm whether the location of the traffic conditions is correct by repeatedly receiving events at the same location. After confirming whether there are traffic conditions, the backend platform refers to the constructed traffic condition map to determine whether to add, update, or remove the static traffic condition information marked on the traffic condition map, and adjusts the prediction conditions of dynamic traffic condition information and updates the predicted future location to provide early warning.

An embodiment of the present invention discloses a traffic condition system for Internet of vehicles based on image recognition, comprising: at least an in-vehicle device and a backend platform, each in-vehicle device being used for capturing a plurality of traffic condition images, processing the captured traffic condition images to determine traffic condition information, and transmitting the traffic condition information to the backend platform as raw traffic condition; the backend platform consolidating the raw traffic condition to become a confirmed traffic condition, and the consolidated confirmed traffic condition being forwarded to relevant in-vehicle devices according to the location of each in-vehicle device; wherein the in-vehicle device further comprising: a visual module for capturing a plurality of traffic condition images, and processing the captured traffic condition images to determine traffic condition information; a vehicle condition module, for providing information comprising: a GPS positioning, a real-time timestamp, a vehicle speed and other vehicle condition information, the best acceleration, deceleration, and average acceleration and deceleration driving information obtained based on the vehicle condition information; an alarm module, for receiving an alarm event and issuing an alarm signal; a device storage module, for storing data of each module in the in-vehicle device; and a control module, respectively connected to the visual module, the vehicle condition module, the alarm module, and the device storage module, and used to control operation of the in-vehicle device and data transmission with the backend platform; the backend platform comprising: a data transmission module, for providing required data according to requests from a plurality of in-vehicle devices; a traffic condition processing module, for receiving and processing each raw traffic condition filed by each in-vehicle device, and transmitting the confirmed traffic condition to the in-vehicle devices according to the GPS position of each in-vehicle device; and a platform storage module, for storing data of each module of the backend platform.

In a preferred embodiment, the visual module further comprises: an image capture unit for capturing a series of continuous images; a real-time image analysis and traffic condition information identification unit, connected to the image capture unit and used to receive and analyze the captured continuous images to identify the traffic condition information contained in the image; and a traffic condition filing unit, connected to the real-time image analysis and traffic condition information identification unit and used to confirm the identified traffic condition information.

In a preferred embodiment, the vehicle condition module further comprises a GPS unit, for providing a GPS positioning; a clock unit, for providing a real-time timestamp; at least a sensor unit, for providing at least a piece of vehicle condition information; wherein the vehicle condition information comprises at least a vehicle speed information; and a vehicle condition analysis unit, for analyzing the vehicle condition information, calculating and obtaining driving information, wherein the driving information comprises: an optimal acceleration speed, an optimal deceleration speed and an average acceleration speed and an average deceleration speed of the vehicle, and the driving information are stored in the device storage module of the in-vehicle device.

In a preferred embodiment, the alarm module further comprises at least an audio alarm unit, a visual alarm unit, or any combination thereof; and is used to receive an alarm event and issue a warning signal, which may be a sound alarm signal, an image alarm signal, or any combination thereof.

In a preferred embodiment, the device storage module stores at least a confirmed traffic map, route and stop data of a fixed-route vehicle, and location information of an emergency vehicle; and the location information of the emergency vehicle is presented in the in-vehicle device as a dynamic non-detectable information.

In a preferred embodiment, the control module further comprises: an event handling unit, connected to the visual module to receive and process data request events from the visual module, and traffic condition filing events; a traffic condition handling unit, connected to the event handling unit, the vehicle condition module, the alarm module and the device storage module to receive traffic conditions and decide whether to transmit an alarm event to the alarm module; and a data gateway unit, connected to the event handling unit and the device storage module, for communicating data with the backend platform to respond to the data request event with data.

In a preferred embodiment, the data transmission module further comprises: a data request receiving unit, for receiving data request from each in-vehicle device; a data request handling unit, connected to the data request receiving unit, for processing the data request; and a data relay unit, connected to the data request handling unit to provide the data to each in-vehicle device.

In a preferred embodiment, the traffic condition processing module further comprises: a traffic condition consolidation unit, for receiving each traffic condition filed from each in-vehicle device, and consolidating the filed traffic condition with each raw traffic condition stored in a raw traffic condition map stored on the platform storage module; a traffic condition location prediction unit, connected to the traffic condition consolidation unit, for predicting possible locations of the traffic condition at different future time points; a raw traffic condition map update unit, connected to the traffic condition location prediction unit, for updating the predicted possible future location of the traffic condition on the raw traffic condition map; a traffic condition confidence measurement unit, connected to the raw traffic condition map update unit to calculate the confidence level of each traffic condition; a confirmed traffic condition map update unit, connected to the traffic condition confidence measurement unit, for updating a new traffic condition with confidence above a threshold to a confirmed traffic condition map; and a traffic condition relay unit, connected to the confirmed traffic condition map update unit, for transmitting traffic conditions in the confirmed traffic condition map to each relevant in-vehicle device according to the GPS position of each in-vehicle device.

In a preferred embodiment, the traffic conditions predicted by the traffic condition location prediction unit comprise static traffic conditions and dynamic traffic conditions, and both are processed by the traffic condition location prediction unit and then delivered to the raw traffic condition map update unit.

In a preferred embodiment, the static traffic condition predicted by the traffic condition location prediction unit is regarded as a special case of dynamic traffic condition, and the predicted future position of the static traffic condition is set as an initial position of the traffic condition.

In a preferred embodiment, the platform storage module stores at least the raw traffic condition map and the confirmed traffic condition map, comprising each raw traffic condition and each confirmed traffic condition, respectively.

In a preferred embodiment, the platform storage module stores at least a fixed-route vehicle's route and stop data, and at least a dynamic traffic condition historical prediction condition, which is used by the traffic condition location prediction unit.

In a preferred embodiment, the dynamic traffic conditions comprise an emergency vehicle position, a bicycle position, and a gravel truck position, and the historical prediction conditions comprise an emergency vehicle speed per hour on a certain road section.

Through the rich traffic condition information of the traffic condition system for Internet of vehicles based on image recognition of the present invention, the driver can make optimal driving decisions, thereby increasing safety. For example, on a normal road, the driver can get information about the traffic conditions outside the visible range in front, as well as the upcoming dynamics of the fixed-route vehicles ahead, such as buses, so that the driver can get aware of possible dynamics, and pro-actively make driving decisions. The driver can also use the prediction mechanism of the backend platform to obtain in advance a reminder of emergency vehicles and avoid potential interference. In addition, on narrow roads or extremely curvy roads, under conditions of poor ahead-looking conditions, drivers can also use prediction mechanisms to obtain information on oncoming cars to avoid inappropriate overtaking decisions.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
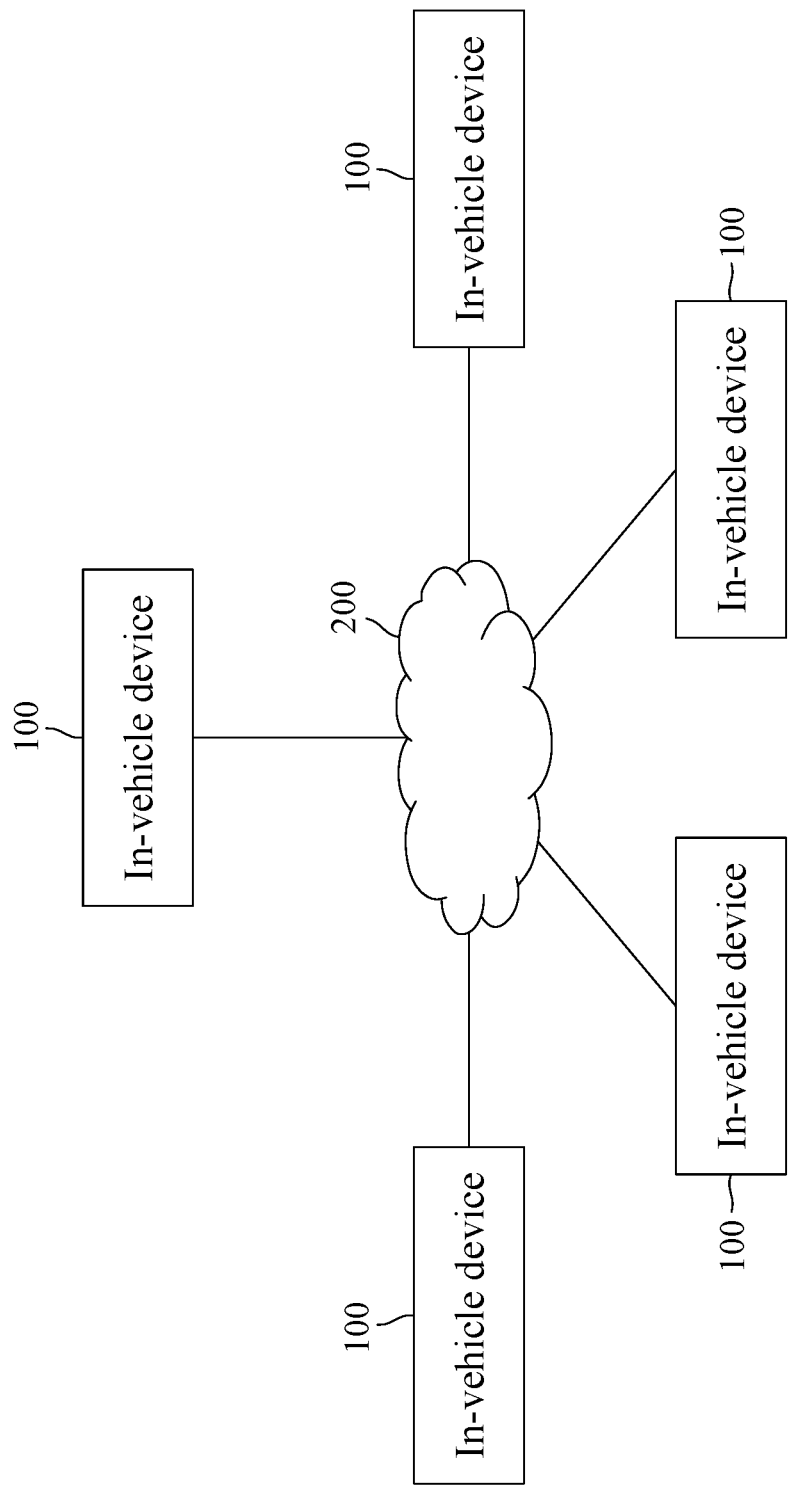
FIG. 1 is a schematic view of a traffic condition system for Internet of vehicles based on image recognition according to the present invention.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
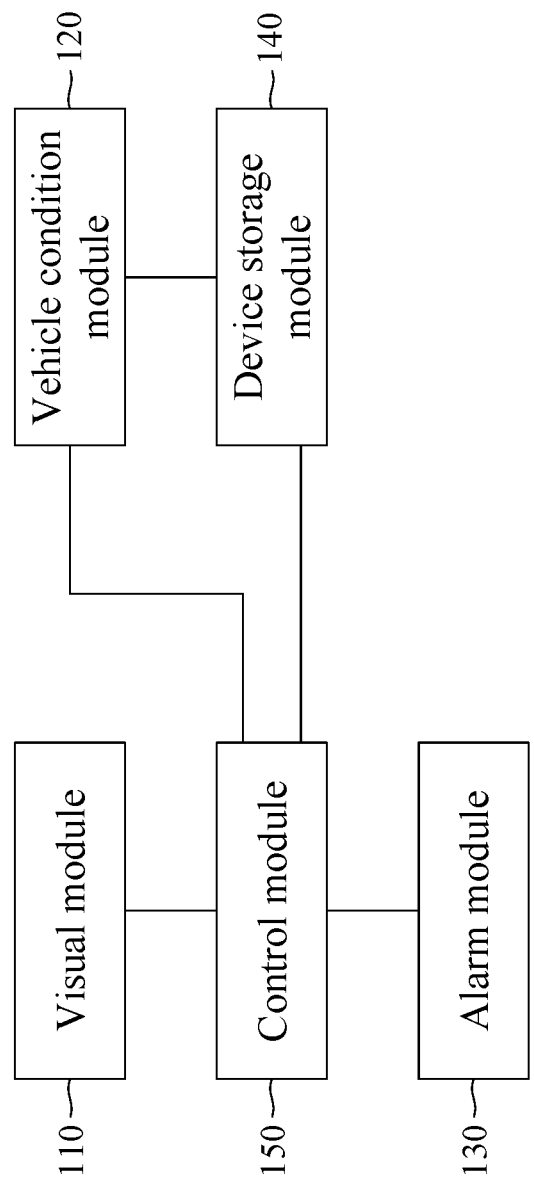
FIG. 2 is a schematic view of the structure of the in-vehicle device of the traffic condition system for Internet of vehicles based on image recognition according to the present invention.
Figure 3:
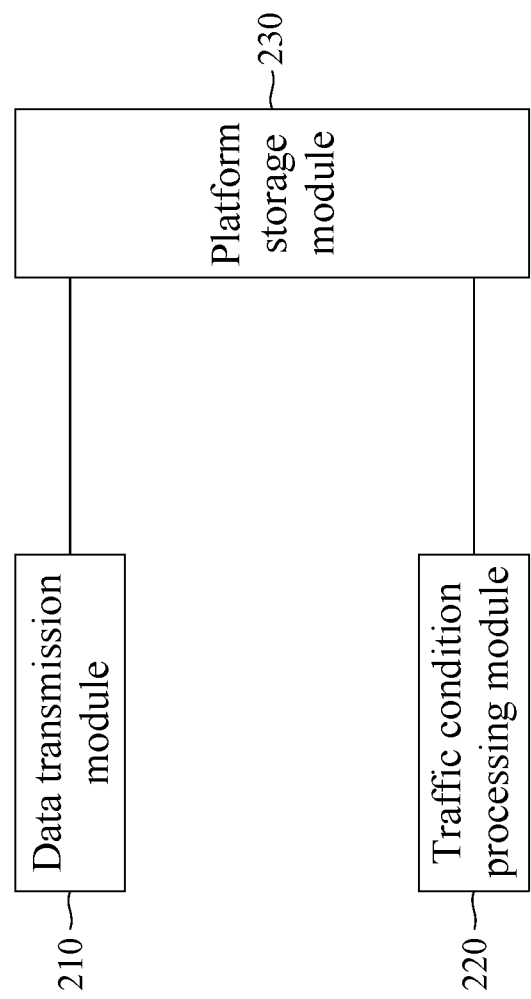
FIG. 3 is a schematic view of the structure of the backend platform of the traffic condition system for Internet of vehicles based on image recognition in the present invention.

Referring to FIG. 1, FIG. 2, FIG. 3, FIG. 1 is a schematic view of a traffic condition system for Internet of vehicles based on image recognition according to the present invention; FIG. 2 is a schematic view of the structure of the in-vehicle device of the traffic condition system for Internet of vehicles based on image recognition according to the present invention; and, FIG. 3 is a schematic view of the structure of the backend platform of the traffic condition system for Internet of vehicles based on image recognition in the present invention. As shown in FIG. 1, FIG. 2, and FIG. 3, the traffic condition system for Internet of vehicles based on image recognition of the present invention comprises: at least an in-vehicle device 100 and a backend platform 200, each in-vehicle device 100 being used for capturing a plurality of traffic condition images, processing the captured traffic condition images to determine traffic condition information, and transmitting the traffic condition information to the backend platform 200 as raw traffic condition; the backend platform 200 consolidating the raw traffic condition to become a confirmed traffic condition, and the consolidated confirmed traffic condition being forwarded to relevant in-vehicle devices 100 according to the location of each in-vehicle device 100; wherein the in-vehicle device 100 further comprising: a visual module 110 for capturing a plurality of traffic condition images, and processing the captured traffic condition images to determine traffic condition information; a vehicle condition module 120, for providing information comprising: a GPS positioning, a real-time timestamp, a vehicle speed and other vehicle condition information, the best acceleration, deceleration, and average acceleration and deceleration driving information obtained based on the vehicle condition information; an alarm module 130, for receiving an alarm event and issuing an alarm signal; a device storage module 140, for storing data of each module in the in-vehicle device; and a control module 150, respectively connected to the visual module 110, the vehicle condition module 120, the alarm module 130, and the device storage module 140, and used to control operation of the in-vehicle device 100 and data transmission with the backend platform 200; the backend platform 200 comprising: a data transmission module 210, for providing required data according to requests from a plurality of in-vehicle devices 100; a traffic condition processing module 220, for receiving and processing each raw traffic condition filed by each in-vehicle device 100, and transmitting the confirmed traffic condition from the processing to the in-vehicle devices 100 according to the GPS position of each in-vehicle device 100; and a platform storage module 230, for storing information for each module of the backend platform 200.

As aforementioned, in the present invention, the traffic condition information is classified into three types: the first type is "easily-detectable information", the second type is "not-easily-detectable information", and the third type is "non-detectable information". Wherein, the first type of easily-detectable information refers to information on traffic conditions that can be seen by the driver and can be known to the driver; the second type of not-easily-detectable information refers to the information on the traffic conditions within the driver's visible range, but unclear and not-ready to use by the driver; the third type of non-detectable information refers to information on the traffic conditions outside the driver's visible range. Furthermore, these types of information can be subdivided into static and dynamic information according to whether the location changes over time.

The information about accident, road construction, and so on, within the driver's visible range is the first type of easily-detectable information, and because the location of the traffic condition does not change with time, the information is considered as static; and the dynamics of a vehicle in front in the driver's visible range is the second type of not-easily-detectable information, and because the position will change over time, the information is categorized as dynamic not-easily-detectable information; and any traffic conditions, either dynamic or static, outside of the visible range of the driver, e.g., 500 meters ahead, are the third type of dynamic or static non-detectable information. For example, the dynamic easily-detectable information may comprise, but not limited to, the locations of moving vehicles, such as ambulances, fire trucks, street sweepers, buses, garbage trucks and other vehicles; static not-easily-detectable information may comprise, but not limited to, driving dynamics, such as, a bus turning right or left, switching to an inner lane or approaching a stop, and a garbage truck turning.

Under the aforementioned categorization of traffic condition information, one of the technical features of the present invention is that each driver can directly obtain the first type of traffic condition information from a plurality of traffic condition images captured by the visual module 110; these traffic condition images are combined with the data, such as, the routes and stops of public fixed-route buses, school buses or garbage trucks, stored in the device storage module 140 of the in-vehicle device 100 or the data from the platform storage module 230 of the backend platform 200 through the access of the data transmission module 210 of the control module 150, to further identify and obtain the second type of traffic condition information. Then, each in-vehicle device 100 can file the first and second types of traffic condition information to the backend platform 200, and after the consolidation of the backend platform 200, the traffic conditions are sent to each relevant driver as the third type of traffic condition information for further use. In addition, the first and second types of traffic conditions will not only be filed to the backend platform 200 by the traffic condition filing unit 113, but will also be directly transmitted by the traffic condition filing unit 113 to the traffic condition processing unit 152 of the in-vehicle device 100 to determine the most appropriate time to alert. In other words, the third type of traffic condition information that each driver needs but unable to obtain directly is obtained by consolidating the first type and second type of traffic condition information from other drivers filed to the backend platform 200.

Wherein, the consolidation of the backend platform 200 is mainly to verify the validity of the filed traffic condition information via cross-validation, and then supplement with the dynamic prediction method to construct a traffic condition map and transmit the traffic condition information to each driver for reference based on the position of the in-vehicle device 100. Specifically, the cross-validation mechanism of the backend platform 200 can repeatedly receive filed reports of traffic conditions at the same location to verify whether there is indeed a traffic condition at that location, and then refer to the constructed traffic condition map to determine whether to add, update, or cancel the static traffic condition information marked on the traffic condition map; or, to adjust the prediction conditions of dynamic traffic condition information and update the predicted future location for early warning. In addition, the backend platform 200 also acts as a transmitter of the non-detectable information in the system of the present invention. According to the position of the in-vehicle device 100, the backend platform 200 refers to the constructed traffic condition map, and replies with the third type of non-detectable information relevant to the in-vehicle device 100, which is then used by the traffic condition processing unit 152 of the in-vehicle device 100 to determine an optimal time to alarm. The traffic condition processing unit 152 calculates the optimal time to alarm according to a plurality of vehicle condition information and driving information provided by the vehicle condition module 120, that is, calculates the optimal time to alarm according to the specific vehicle condition and driving environment, and transmits an alarm signal to the alarm module 130 to warn the driver. The specific vehicle conditions mentioned above may comprise, but not limited to, the best acceleration and deceleration speeds, average acceleration and deceleration speeds, and so on; and the driving environment may comprise, but not limited to, the amount of front and behind traffic and whether the vehicle is driving on uphill or downhill sections. For example, the vehicle condition module 120 can provide a GPS positioning, a real-time timestamp, speed and other related vehicle condition information, and the driving information, such as, the best acceleration and deceleration speeds, and average acceleration and deceleration speeds obtained based on the above vehicle condition information. Wherein, the best acceleration and deceleration can be obtained by analyzing the vehicle speed and related sensor information for a continuous period of time. It is worth noting that such driving information can be used in subsequent calculations of the optimal time to alarm for a traffic condition; the so-called optimal time to alarm may be different, for example, for ordinary cars and gravel trucks on the highway, because the time or distance required to decelerate or brake is different, which may be 5 seconds or more in difference. Furthermore, the acceleration or deceleration capabilities may vary greatly due to the load on the vehicle.

Figure 4:
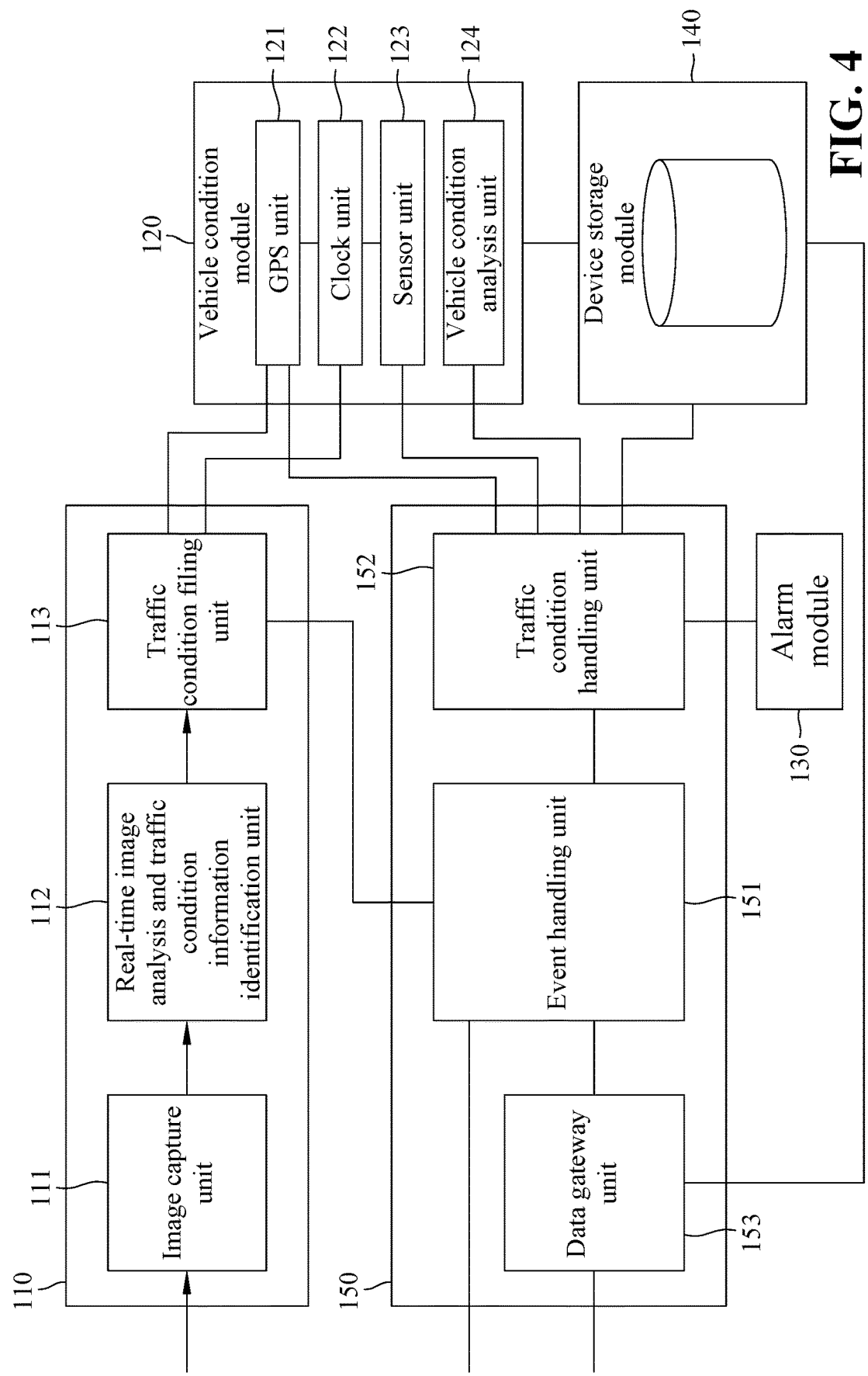
FIG. 4 is a detailed view of the in-vehicle device of the traffic condition system for Internet of vehicles based on image recognition according to the present invention.

As shown in FIG. 4, in a preferred embodiment, the visual module 110 further comprises: an image capture unit 111 for capturing a series of continuous images; a real-time image analysis and traffic condition information identification unit 112, connected to the image capture unit 111 and used to receive and analyze the captured continuous images to identify the traffic condition information contained in the images; and a traffic condition filing unit 113, connected to the real-time image analysis and traffic condition information identification unit 112 and used to confirm the identified traffic condition information. The image capture unit 111 may be a camera. Specifically, the traffic condition information identified by the real-time image analysis and traffic condition information identification unit 112 further comprises the aforementioned first type of easily-detectable information and the second type of not-easily-detectable information. For the first type of easily-detectable information, the in-vehicle device 100 submits and uploads to the backend platform 200 in real-time through the control module 150. For the second-type of not-easily-detectable information, such as, static information of fixed-route vehicles, the relevant information is obtained through the control module 150 and then uploading to the backend platform 200. In addition, the first and second types of traffic conditions are also directly transmitted to the traffic condition processing unit 152 to determine an optimal alerting time.

Specifically, the real-time image analysis and traffic condition information identification unit 112 notifies the traffic condition filing unit 113 when the real-time image analysis and traffic condition information identification unit 112 detects a second type of traffic condition, and the traffic condition filing unit 113, after obtaining the required data, constructs a second type of traffic condition information. Furthermore, if no traffic conditions are detected, the traffic condition filing unit 113 may submit a periodical driving message, which informs the backend platform 200 that no traffic conditions are detected.

Similarly, the vehicle condition module 120 further comprises a GPS unit 121, for providing a GPS positioning; a clock unit 122, for providing a real-time timestamp; at least a sensor unit 123, for providing at least a piece of vehicle condition information; wherein the vehicle condition information comprises at least a vehicle speed information; and a vehicle condition analysis unit 124, the vehicle condition analysis unit for analyzing the vehicle condition information, calculating and obtaining driving information, comprising: an optimal acceleration speed, an optimal deceleration speed and an average acceleration and deceleration speeds of the vehicle, and store the driving information in the device storage module of the in-vehicle device. The alarm module 130 further comprises at least an audio alarm unit, a visual alarm unit, or any combination thereof; and is used to receive an alarm event and issue a warning signal, which may be a sound alarm signal, an image alarm signal, or any combination thereof. The device storage module 140 stores at least a confirmed traffic map, route and stop data of a fixed-route vehicle, and location information of an emergency vehicle; and the location information of the emergency vehicle is presented in the in-vehicle device as a dynamic non-detectable information. Wherein the confirmed traffic condition map comprises the traffic conditions of the first type of easily-detectable information and the second type of not-easily-detectable information identified by the visual module 110, and the traffic conditions of the third type of non-detectable information received from the backend platform 200; in other words, the Confirmed traffic condition map comprises all the traffic conditions filed by other drivers and confirmed after cross-validation via the backend platform 200. Furthermore, the confirmed traffic condition map, the route and stop data of the fixed-route vehicle, and the location information of the emergency vehicle, which is presented on the in-vehicle device as dynamic, non-detectable information, are the data required by the visual module 110 when recognizing the traffic conditions of second type information or when the control module 150 calculates an optimal time to alarm. It is worth noting that if the route and stop data of the fixed-route vehicle are not in the device storage module 140, the data can be obtained through the control module 150 from the platform storage module 230 of the backend platform 200.

Similarly, in a preferred embodiment, the control module 150 further comprises an event handling unit 151, connected to the visual module 110 to receive and process data request events from the visual module 110, and traffic condition filing events; a traffic condition handling unit 152, connected to the event handling unit 151, the vehicle condition module 120, the alarm module 130 and the device storage module 140 to receive traffic conditions and decide an optimal time to transmit an alarm event to the alarm module 130, and store the traffic conditions that are not yet reaching the optimal time to alarm in the device storage module 140; and a data gateway unit 153, connected to the event handling unit 151 and the device storage module 140, for communicating data with the backend platform 200 to respond to the data request event with data. It is worth noting that the data gateway unit 153 can retrieve the required data from the device storage module 140 or from the backend platform 200 when the traffic condition filing unit 113 constructs the second type of traffic condition information, and then transfer the information to the traffic condition filing unit 113.

In summary, the in-vehicle device 100 of the present invention identifies, through the real-time image analysis and traffic condition information identification unit 112 of the visual module 110, the first type of traffic condition information, and uses the traffic condition filing unit 113 after receiving data via the control module 150 to identify the second type of traffic condition information. Then, the traffic condition filing unit 113 submits (i.e., files) the identified first and second types of traffic conditions to the backend platform 200 via the event handling unit 151 of the control module 150. On the other hand, after the third type of traffic condition information transmitted from the backend platform 200 is received by the control module 150, the traffic condition handling unit 152 processes the received third type of traffic condition information with other traffic conditions already stored in the device storage module 140 in accordance with the vehicle condition module 120. The vehicle condition information provided by the vehicle condition module 120 is processed together to determine the optimal time to alarm, and the alarm module 130 is used to remind the driver of the traffic conditions to be aware of.

In other words, the traffic condition handling unit 152 is responsible for processing the identified first and second types of traffic condition information submitted by the traffic condition filing unit 113, the third type of traffic condition information transmitted from the backend platform 200, as well as the traffic conditions temporarily stored in the device storage module 140 that had not yet reached the optimal time to alarm as determined by the traffic condition handling unit 152 previously.

Figure 5:
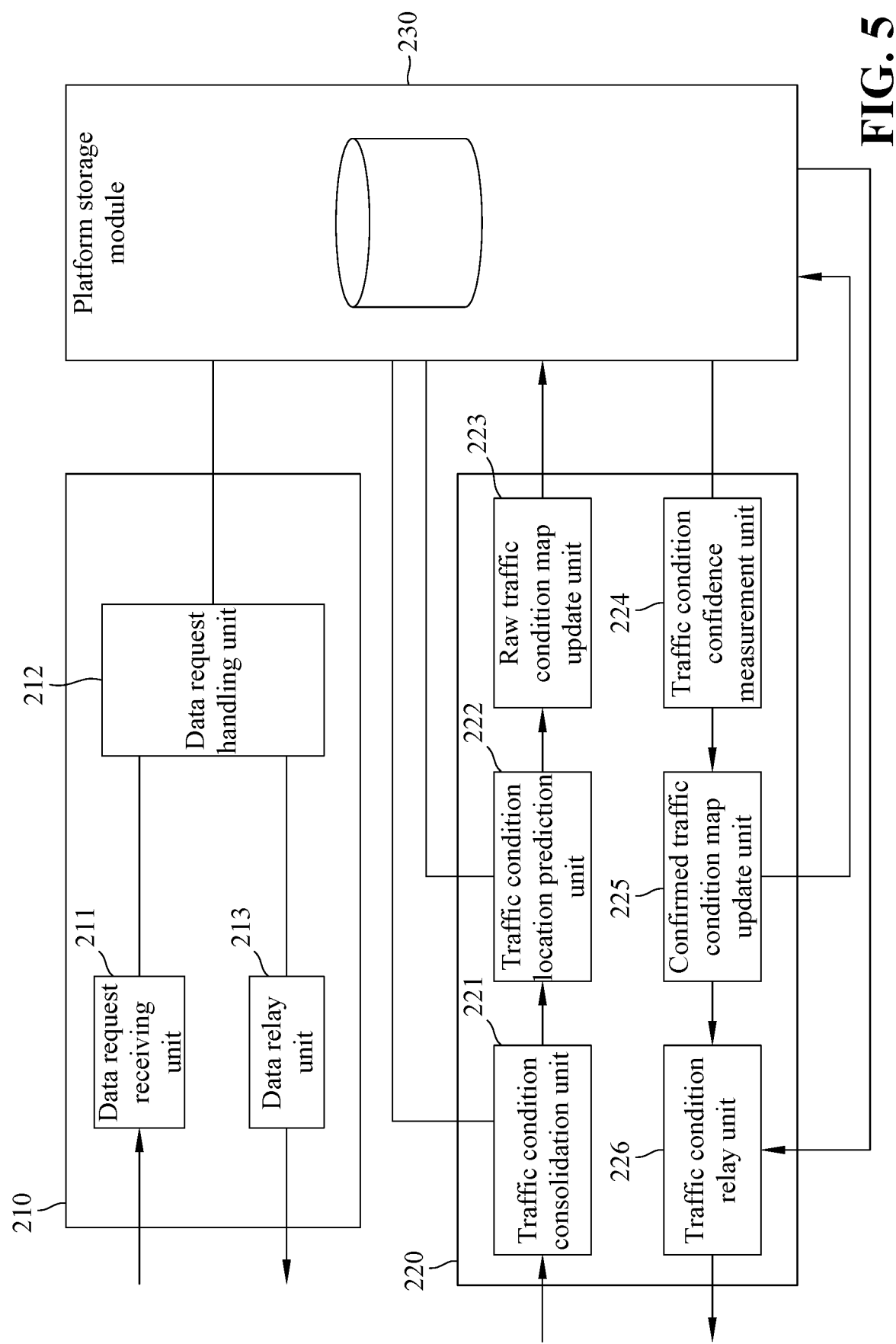
FIG. 5 is a detailed view of the backend platform of the traffic condition system for Internet of vehicles based on image recognition according to the present invention.

Similarly, as shown in FIG. 5, in a preferred embodiment, the data transmission module 210 further comprises: data request receiving unit 211, for receiving data request from each in-vehicle device 100; a data request handling unit 212, connected to the data request receiving unit 211, for processing the data request; and a data relay unit 213, connected to the data request handling unit 212 to provide the data to each in-vehicle device 100. Specifically, the data transmission module 210 receives a data request event from the data gateway unit 153 of the control module 150 in the in-vehicle device 100. The data request event is a request, for example, for a route, stops, and other related static information of a fixed-route vehicle. For example, when the traffic condition filing unit 113 needs to construct the second type of traffic condition information, the traffic condition filing unit 113 first sends a data request to the event handling unit 151, and the event handling unit 151 forwards the data request to the data gateway unit 153; the data gateway unit 153 first checks whether the required data has been stored in the device storage module 140, and if so, the data gateway unit 153 sends the requested data directly; otherwise the data gateway unit 153 sends a data request to the backend platform 200 and store the data retrieved from the backend platform 200 in the device storage module 140.

Furthermore, the traffic condition processing module 220 further comprises: a traffic condition consolidation unit 221, a traffic condition location prediction unit 222, a raw traffic condition map update unit 223, a traffic condition confidence measurement unit 224, and a confirmed traffic condition map update unit 225 and a traffic condition relay unit 226; the cross-validation mechanism of the backend platform 200 starts at the traffic condition consolidation unit 221 and ends with the confirmed traffic condition map update unit 225.

Wherein, the traffic condition consolidation unit 221 is configured to receive each traffic condition filed from each in-vehicle device 100, and compare the received traffic condition with each raw traffic condition of the existing raw traffic condition maps already stored in the platform storage module 230 for identification, and then an existing traffic condition or a new traffic condition is outputted to the traffic condition location prediction unit 222. Since a traffic condition may be submitted by different in-vehicle devices 100 at different points in time, the main function of this unit is to consolidate the same traffic condition submitted by different in-vehicle devices. It is worth noting that at this time, no traffic conditions have been confirmed, that is, proceeding to the subsequent confidence calculation.

The traffic condition location prediction unit 222 is connected to the traffic condition consolidation unit 221 and predicts possible positions of the traffic condition at different future points in time for each traffic condition. If the traffic condition is a static traffic condition, the future possible position is the current position of the traffic condition; the raw traffic condition map update unit 223 is connected to the traffic condition location prediction unit 222 to update the predicted possible future position of the dynamic traffic condition to the raw traffic condition map.

The traffic condition confidence measurement unit 224 is connected to the raw traffic condition map update unit 223 to calculate a confidence level of each traffic condition, and determines whether the traffic condition indeed exists based on the confidence level; the confirmed traffic condition map update unit 225 is connected to the traffic condition confidence measurement unit 224 to update the traffic conditions with a confidence level above a threshold to a confirmed traffic condition map; in other words, new traffic conditions can be added, existing traffic conditions can be updated, or traffic conditions that have already been resolved can be removed from the confirmed traffic condition map; and the traffic condition relay unit 226 is connected to the confirmed traffic condition map update unit 225 and the platform storage module 230, so as to relay the relevant traffic conditions in the confirmed traffic condition map to the in-vehicle device 100 according to the GPS position of each in-vehicle device 100.

It is worth noting that the traffic condition consolidation unit 221 and the traffic condition confidence measurement unit 224 are the aforementioned units that perform cross-validation to confirm the validity of each submitted traffic condition information filed by different in-vehicle devices 100; the traffic condition consolidation unit 221 can recognize the event received at the same location repeatedly, and then confirm whether there is traffic condition at the location through the traffic condition measurement unit 224, and then refer to the established confirmed traffic condition map to determine whether to add, update, or cancel the confirmed traffic condition map. The traffic condition location prediction unit 222 is supplemented by the aforementioned dynamic prediction method, and refers to the relevant data stored in the platform storage module 230 to adjust the prediction conditions of each traffic condition information and updates the predicted future position for early warning.

The traffic condition confidence measurement unit 224 calculates a confidence level of each traffic condition; the confidence level indicates the degree of confidence in the existence of the traffic condition. Since many traffic conditions will be ruled out or solved over time, for example, a car accident site, road maintenance site and closed lanes. Therefore, each submitted traffic condition in the exemplary embodiment of the present invention is given a report time and a release time; when the submitted traffic condition is before the release time, it can be considered as a valid traffic condition, for example, five drivers submit the same traffic accident traffic condition at different times. By calculating the conditions submitted at the five different times and their respective release time, the system can determine with confidence that the traffic conditions continue to exist. When the confidence level of the traffic condition is higher than a predefined threshold, the confirmed traffic condition map update unit 225 updates the confirmed traffic condition map. Finally, the traffic condition relay unit 226 relays the relevant traffic conditions in the confirmed traffic condition map to the in-vehicle device 100 according to the GPS position of each individual in-vehicle device 100.

In summary, the entire cross-validation mechanism of the backend platform starts with the traffic condition consolidation unit 221 and ends with the confirmed traffic condition map update unit 225. The traffic condition consolidation unit 221 compares the submitted traffic condition with an existing traffic condition for identification and outputs an existing traffic condition or a new traffic condition, which is passed on to the traffic condition location prediction unit 222. The traffic condition location prediction unit 222 predicts the future possible position of the traffic condition (for a static traffic condition, the future possible position is always the current position), and requests the raw traffic condition map update unit 223 to update the raw traffic condition map. After the raw traffic condition map update unit 223 updates the raw traffic condition map, the traffic condition confidence measurement unit 224 determines whether the traffic condition actually exists, and requests the confirmed traffic condition map update unit 225 to update the confirmed traffic condition map.

It is worth noting that the calculation of the traffic condition confidence can be implemented in different ways, which is described below with reference to only a preferred embodiment, but not limited thereto.

Let a traffic condition report be denoted by a two-tuple (T, $\chi$), where T denotes the detection time to report the traffic condition, that is, the time in-vehicle device 100 finds and reports the traffic condition. It is worth noting that the traffic condition might have actually occurred earlier. $\chi$ denotes detection result, where $\chi$=0 means no traffic condition, and $\chi$=1 means traffic condition. The main purpose of such design is to allow the in-vehicle device can also report when no traffic condition is detected (i.e., $\chi$=0), which is used later as a reference basis for subsequent cross-validation with other related traffic condition reports. In other words, the no-condition report can be regarded as a periodical traffic information reports, i.e., the so-called periodical or regularly reported traffic information means that when there is no traffic condition, a special first-type traffic condition information can be submitted by the in-vehicle device to indicate that there is no traffic condition detected. This regularly reported traffic information can be used for subsequent cross-validation and consolidation of traffic conditions, and calculation of confidence. With confidence calculations that include regularly reported traffic information indicating no traffic conditions, the resolved traffic conditions can be removed.

Furthermore, a traffic condition record can be denoted by a triple (T, $\chi$, $\Gamma$), where $\Gamma$ denotes the expiration time of the traffic condition record, $\Gamma$=T+Ơ, where Ơ denotes a valid duration. In other words, for any time point T0, if T0<$\Gamma$, the traffic condition triple (T, $\chi$, $\Gamma$) is a valid traffic condition record. It is worth noting that the expiration of the traffic condition record does not necessarily mean that the traffic condition with which the record is associated has also ended or resolved.

When the in-vehicle device 100 detects a traffic condition, the in-vehicle device 100 reports the traffic condition and the backend platform 200 generates a corresponding traffic condition record.

Taking the traffic conditions of a traffic accident as an example, it is assumed that at most M valid traffic condition records are used to calculate the confidence level every time. For time point T, let N be the total number of traffic condition records, m=min {M, n}, where n is the number of valid traffic condition records (n≤N), and let (T1, $\chi$1, $\Gamma$1), (T2, $\chi$2, $\Gamma$2) . . . (Tm, $\chi$m, $\Gamma$m) denote the latest m traffic condition records.

Accordingly, the confidence level conf of the traffic accident traffic condition at time point T can be defined as:
When N>1, $$conf = \frac{1}{m}\sum_{j=1}^{m} \chi_j \frac{\Gamma_j - T}{O'}$$
$$= \frac{1}{m}\sum_{j=1}^{m} \chi_j \frac{(T_j + O') - T}{O'}$$
$$= \frac{1}{m}\sum_{j=1}^{m} \chi_j \left(1 - \frac{T - T_j}{O'}\right)$$

Otherwise, conf=0.1;
Wherein, when Ơ=∞, $$conf = \frac{1}{m}\sum_{j=1}^{m} \chi_j$$

In other words, in the present embodiment, the confidence level of each individual traffic condition record is related to the time left before the traffic condition record expires. The weighted average of the confidence level of all effective traffic condition records included in the calculation is the confidence level of the traffic condition with which the record is associated. It is obvious that other functions can also be used for the confidence level without affecting the scope of the present invention.

For example, specifically, in the above example, when M=5 and Ō=30, it is assumed that all the traffic condition records related to the traffic accident traffic conditions are as follows:

|       | $R_1$ | $R_2$ | $R_3$ | $R_4$ | $R_5$ |
|-------|-------|-------|-------|-------|-------|
| $T_j$ | 14:00 | 14:03 | 14:03 | 14:05 | 14:33 |
| $\chi_j$ | 1 | 1 | 0 | 1 | 1 |
| $\Gamma_j$ | 14:30 | 14:33 | 14:33 | 14:35 | 15:03 |

When T=14:01, N=n=m=1; conf=0.1
When T=14:0, N=n=m=3;

$$conf = \frac{1}{3}\left[1*\left(1-\frac{4}{30}\right)+1*\left(1-\frac{1}{30}\right)+0*\left(1-\frac{1}{30}\right)\right]$$

When T=14:34, N=5, n=m=2;

$$conf = \frac{1}{2}\left[1*\left(1-\frac{29}{30}\right)+1*\left(1-\frac{1}{30}\right)\right]$$

In a preferred embodiment, the platform storage module 230 stores a traffic condition map comprising all the traffic conditions, wherein the traffic condition map may further be divided into, but not limed to, at least one raw traffic condition map and one confirmed traffic condition map, which include all raw traffic conditions and all confirmed traffic conditions respectively. The platform storage module 230 stores at least a route and stop data for fixed-route vehicles, and historical prediction conditions for dynamic traffic conditions. The so-called historical prediction conditions of dynamic traffic conditions refer to the rules of dynamic traffic condition prediction based on the traffic conditions in the past. For example, an emergency vehicle is detected to travel at a speed of 40 KM/H on a certain section of a road, and the prediction is based on this specific dynamic traffic condition; after a period of time, the emergency vehicle is detected to be faster than the predicted speed (for example, 45 KM/H), so a new prediction rule is generated based on the speed as, for example, 42.5 KM/H. The aforementioned traffic condition location prediction unit 222 predicts the future position of the traffic condition based on the historical prediction conditions of these dynamic traffic conditions.

In summary, the backend platform 200 mainly maintains the raw traffic condition map and the confirmed traffic condition map, and consolidates the traffic conditions submitted by each in-vehicle device 100 through cross-validation, dynamic prediction, and traffic condition confidence measurement to continuously update the raw traffic condition map and the confirmed traffic condition map respectively, and then the updated relevant traffic condition information is transmitted back to the in-vehicle device 100.

Figure 6:
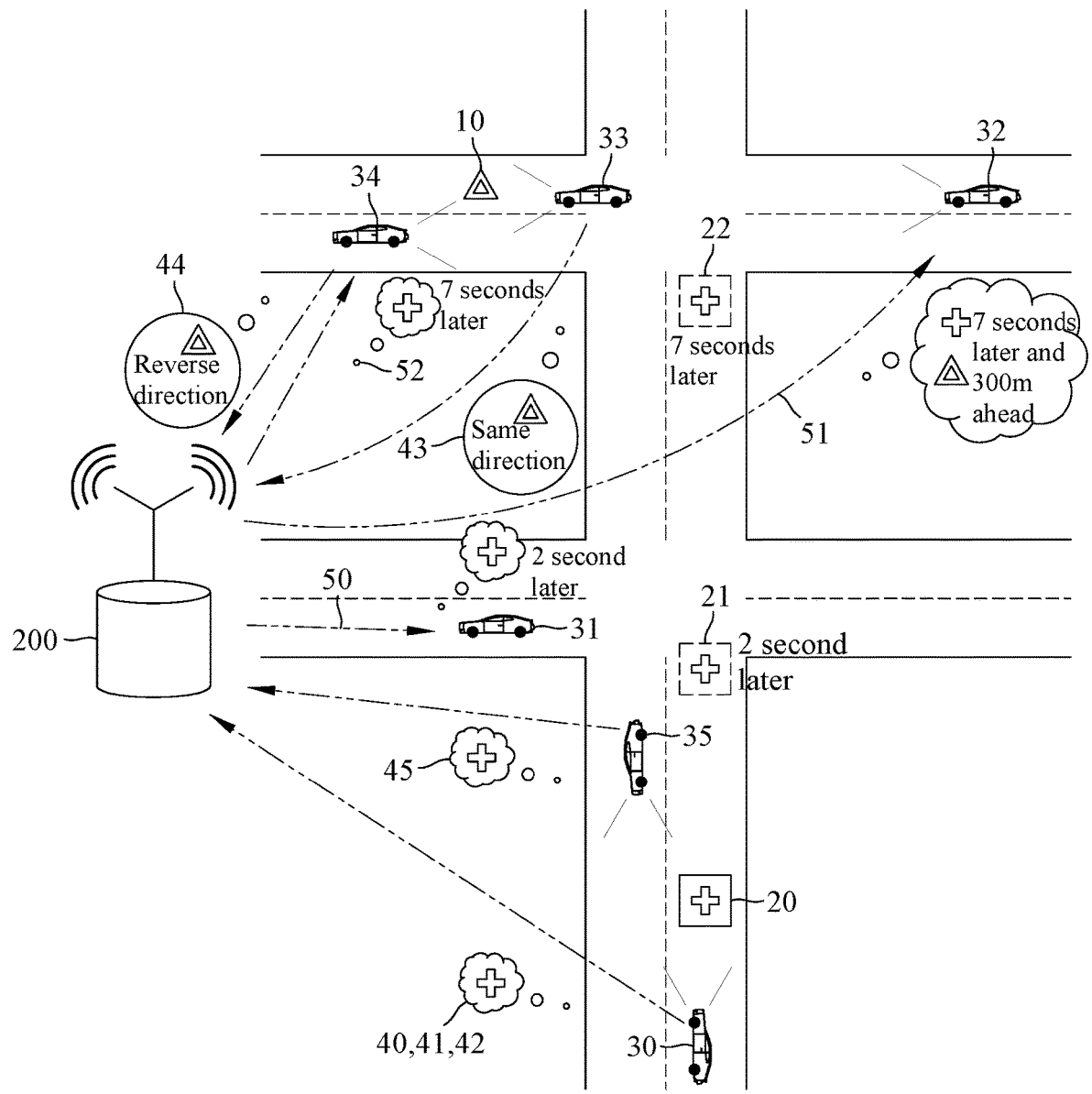
FIG. 6 is a schematic view of an exemplary scenario of a plurality of vehicles on a traffic condition system for Internet of vehicles based on image recognition according to the present invention.

FIG. 6 is a schematic view of an exemplary scenario of a plurality of vehicles on a traffic condition system for Internet of vehicles based on image recognition. The traffic condition information in FIG. 6 includes the emergency vehicle 20 (dynamic traffic condition information), the accident site 10 (static traffic condition information), and the driving vehicles 30, 31, 32, 33, and 34 in motion, and all the vehicles 30, 31, 32, 33 and 34 are equipped with the in-vehicle device of the present invention.

As shown in FIG. 6, one of the events is that the vehicle 30 is driving behind the emergency vehicle 20, and because the vehicle 30 has followed the emergency vehicle 20 for a period of time, the in-vehicle device of the vehicle 30 repeatedly recognizes that there is an emergency vehicle 20 in front. The in-vehicle device combines these continuously identified dynamic easily-detectable traffic condition information (40, 41, 42) with related positioning information, and uploads to the backend platform 200. After receiving the continuously submitted traffic condition information from the vehicle 30, the backend platform 200 will use a cross-validation mechanism to confirm the addition of the dynamic traffic condition information, and generate the initial prediction conditions based on the past emergency vehicle movement prediction conditions and the vehicle 30 positioning information. The prediction conditions are used to predict the future position of the dynamic traffic condition information, i.e., the predicted positions 21, 22 of the emergency vehicle 20 after 2 seconds and 7 seconds respectively, as shown in FIG. 6.

In addition, according to FIG. 6, the other event described is that when the vehicle 31 regularly reports traffic information during driving, the backend platform 200 reveals that the vehicle 31 will encounter the emergency vehicle 20 after 2 seconds according to the prediction result. This dynamic traffic condition information (i.e., the third type of dynamic non-detectable traffic condition information for vehicle 31) is relayed back to the in-vehicle device of vehicle 31, and the in-vehicle device of vehicle 31 analyzes its own vehicle condition information and driving information to determine the optimal time to alarm to warn the driver.

Furthermore, the other event shown is that vehicles 32, 33 are traveling in the same direction on the same road, and the in-vehicle device of the vehicle 33 identifies an accident 10, and returns this static easily-detectable traffic condition information 43 as an event to the backend platform 200. At the same time, the in-vehicle device of the vehicle 34 on the oncoming traffic lane of the same road also detects the same accident 10 and transmitted this information 44 in an event to the backend platform 200.

Next, after receiving events 43 and 44 from the vehicles 33, 34 respectively, the backend platform 200 confirms to add the static traffic condition information to the traffic condition map using a cross-validation mechanism, and relays the traffic condition information 50, 51, 52 to the in-vehicle devices of vehicles 31, 32, and 34 (as the third type of static non-detectable traffic conditions for vehicle 32), and the in-vehicle device of the vehicle 32 determines the optimal time to alarm the driver based on the collected vehicle condition information; wherein, the traffic condition information 50, 51, and 52 are: emergency vehicle 20 ahead in 2 seconds, emergency vehicle 20 ahead in 7 seconds, and traffic accident 300 meters ahead (confirmed traffic condition by events 43, 44) and encountering an emergency vehicle 20 ahead in 7 seconds.

Yet another event described in FIG. 6 is that the in-vehicle device of the vehicle 35 recognizes that the emergency vehicle 20 is driving in the oncoming traffic lane, therefore this dynamic easily-detectable traffic condition information 45 and the current positioning information are uploaded to the backend platform 200, which uses a cross-validation mechanism to verify and update the predicted conditions of the dynamic traffic conditions information of emergency vehicle 20 and the possible future location.

Figure 7:
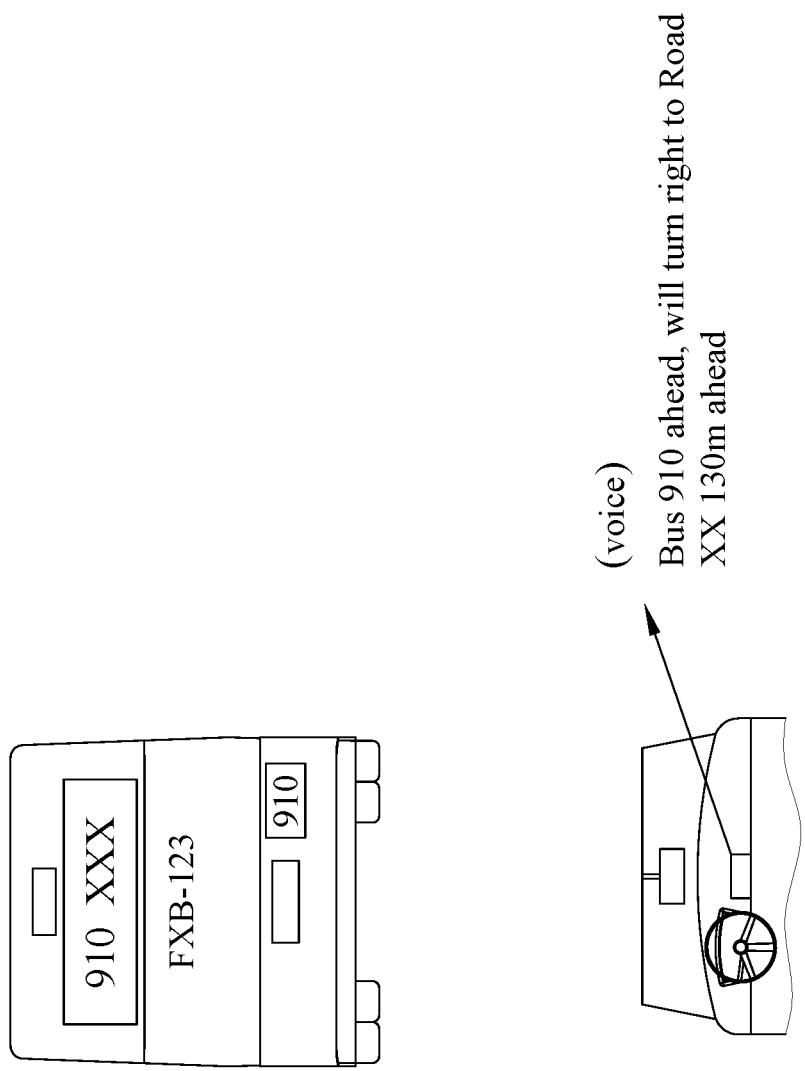
FIG. 7 is a schematic view illustrating how the in-vehicle device determines the second type of static not-easily-detectable information and warns a driver with a bus as an example.

The scenario of FIG. 6 illustrates how each in-vehicle device handles dynamic and static easily-detectable information and how the backend platform determines the dynamic and static non-detectable information relative to each in-vehicle device. FIG. 7 uses a bus as an example to briefly describe how the in-vehicle device determines the second type of static not-easily-detectable information and warns the driver. As shown in FIG. 7, when the in-vehicle device recognizes that a bus is moving ahead, the in-vehicle device tries to use the route number plate or license plate and refers to the current position and related data to identify the bus route. Then, after obtaining the information of the bus route to the in-vehicle device can warn the driver of the possible movements of the bus, such as, 130 meters ahead, the bus will turn right to Road XX, 50 meters ahead, the bus will stop at the bus stop and will cut to the dedicated bus lane, and so on.

It is worth noting that, in the present invention, each in-vehicle device first recognizes objects such as lanes, vehicles, pedestrians, accidents, and road construction in a single captured image, and then combines the recognition results of a series of images and the current relevant vehicle condition information, such as speed, to identify the traffic condition information, and calculate confidence level for each recognized traffic condition. The following is an example of the detection of ambulance going in the same direction, explaining the calculation of confidence level, the determination of establishing traffic conditions, and the determination of dynamic/static attribute of conditions.

It is assumed that the image capture unit 111 of the in-vehicle device 100 can capture 60 images per second. In order to improve the accuracy, every 20 images can be used to determine the traffic condition information captured. First, the real-time image analysis and traffic condition information identification unit 112 of the in-vehicle device identifies the ambulance in each single image. If the ambulance is detected in 10 out of the 20 captured images, the confidence level is calculated as 50%. If the confidence level is greater than the threshold defined according to the vehicle speed, the real-time image analysis and traffic condition information identification unit 112 determines that the traffic condition information of the ambulance does appear within the visible range. In addition, the real-time image analysis and traffic condition information identification unit 112 further analyzes the position of the ambulance in 10 consecutive images, and refers to the current vehicle speed to determine whether the ambulance is moving, and then determines whether the recognized traffic condition is dynamic or static.

After the dynamic/static traffic condition information determined by the real-time image analysis and traffic condition information identification unit 112 is established, the next step is to determine whether the preceding vehicle has relevant not-easily-detectable information. Taking a bus as an example, once it is determined that there is a bus in front, the real-time image analysis and traffic condition information identification unit 112 informs the traffic condition filing unit 113 that there is a second type of traffic condition, and then the traffic condition filing unit 113 according to the current position and the recognized information such as the route number plate or license plate of the bus, determine the bus route, and obtain the detailed route data to obtain static not-easily-detectable information. It is worth noting that this example can be applied to any vehicle whose route is disclosed or available for public access.

The static traffic condition information identified by the in-vehicle device at least includes, but not limited to, accidents, vehicle breakdowns, road construction, objects in the lane, and so on; dynamic traffic condition information, includes at least, but not limited to, the number and type of vehicles within visible range and driving in both direction, pedestrians with unusual behavior or reduced mobility; wherein, the types of vehicles include at least emergency vehicles, such as ambulances or fire engines, bicycles, motorcycles, large motorcycles, passenger cars, trucks, gravel trucks, buses, tour buses, trailers and garbage trucks. In addition, when the in-vehicle device communicates with the backend platform, the in-vehicle device will send its own positioning information, which may also include, but not limited to, GPS information, altimeter information, and lane information.

On the other hand, for the backend platform, the traffic condition information is only divided into dynamic and static, but not which type. When receiving the static traffic condition information from the in-vehicle device, the backend platform first checks whether a traffic condition at the same or similar location already exists on the traffic condition map. If not, a preset release time (time at which the traffic condition expects to be expired) and a preset confidence level are assigned to the traffic condition, and marked on the traffic condition map; if existing, the preset release time is updated and the confidence level is increased. On the other hand, when receiving the dynamic traffic condition information from the in-vehicle device, the backend platform first searches the traffic condition map to see if a predicted location of the same traffic condition is marked at the similar location. If not, the initial prediction conditions are determined, and the prediction of the possible positions within a fixed time frame based on the prediction conditions is made, and marked on the traffic condition map with a preset confidence; otherwise, the cross-validation with previous predicted locations is performed to update the prediction conditions, and in turn, the new predicted location is marked on the traffic condition map and the confidence level of the event is increased.

On the other hand, if the backend platform receives the periodical or regularly reported information without any traffic conditions from the in-vehicle device, the backend platform checks whether there are marked dynamic/static traffic conditions information on the traffic condition map. If so, reduce the level of confidence of the marked traffic condition. When the confidence level is decreased to a threshold, the traffic condition will be deleted from the traffic condition map.

In the dynamic traffic condition prediction mechanism disclosed by the present invention, the backend platform refers to the driving positioning information of the filing vehicle and the historical prediction records of similar events in the past to generate initial prediction conditions, and estimates the possible locations at different future time points. Thereafter, when receiving the same dynamic traffic condition reported from other in-vehicle devices, the actual speed of the dynamic traffic condition can be obtained by analyzing the previously reported position and the currently reported position and respective time points, and the prediction conditions can be revised or adjusted as the vehicle speed to produce new predictions. It is worth noting that the actual speed of the dynamic traffic conditions can be obtained in different ways, and the preferred embodiments here only describes a possible implementation, but not limited thereto. After the backend platform receives the information reported by the in-vehicle device, the backend platform refers to the established traffic condition map and, depending on the driving position of the in-vehicle device, relays information with a confidence level higher than a threshold and considered non-detectable to the in-vehicle device.

In addition, after the in-vehicle device obtains the confirmed traffic conditions that require warning, the in-vehicle device must determine the optimal time to alarm. However, the determination needs to take into account relevant information including, but not limited to, vehicle conditions, such as reaction time for processing the information, current speed, current lane, surrounding traffic conditions, vehicle conditions, and road conditions. In a preferred embodiment, because the driver is less able to cope with an emergency while cornering, the position information may include an actual position and a position to be handled; when the traffic condition occurs in the middle of a corner, the event can be regarded as occurring at the corner entry (that is, the position to be handled in context of alarming time), in which case the actual position is different from the position to be handled; on the other hand, when the real position is on the straight road, the two positions can be the same.

In addition, the vehicle condition information to be considered includes, but not limited to, at least the best acceleration and deceleration speeds and the average acceleration and deceleration speeds, and the collection of information can be obtained from GPS positioning information, or accelerometer, or on-board diagnostics (OBD) information, sensors, or any combination of the above. For example, assumed that the in-vehicle device uses sound as a warning medium, and traffic condition information to be warned is: Construction on the inside lane, 1000 meters ahead. When driving on a straight road, the actual position is the same as the position to be handled. If the vehicle is driving at 100 KM/H currently on the inside lane with few surrounding vehicles, and it takes 8 seconds for the vehicle to slow down to 50 KM/H, and the driver needs 2 seconds to process the information, then the in-vehicle device will determine that the optimal time to alarm the driver at 8+2+bias (bias is a fixed value) seconds before approaching the construction site. However, if there are many surrounding vehicles, the deceleration speed parameter must be modified to the time required for the vehicle to slow down to 0 KM/H, and the optimal time to warn the driver is also modified accordingly. In addition, if the current vehicle is not in the inner lane, to respond to the lane changing dynamics of the vehicles in front driving in the inner lane, the optimal time to alarm the driver should still be calculated with the same parameters, but it is necessary to inform that this event occurred in the inner lane and leave the deceleration decision to the driver. After the in-vehicle device calculates the optimal time to alarm according to the above procedure, if the time is less than a threshold, e.g., 5 seconds, the in-vehicle device immediately alerts the driver; otherwise, the calculated optimal time to alarm is used to alert the driver.

Furthermore, the traffic condition system for Internet of vehicles based on image recognition of the present invention may further comprise at least a third-party traffic condition data interface unit to receive traffic condition information from a third party, and other traffic condition information on the public transport data exchange (PTX). Taking the dynamic traffic conditions of buses as an example, since the real-time location of each bus is disclosed on the above-mentioned PTX platform, the real-time location of each bus can be obtained through the third-party data interface unit, and reference to the bus route information stored in the platform storage module, the dynamic bus information can be, as well as the static traffic condition information of the bus about to turn left and right, change lanes, and so on. Then, the traffic conditions are transmitted to the traffic condition handling unit for subsequent processing to relay to each driver. Furthermore, the third-party traffic condition data interface unit may be provided on the backend platform or on the in-vehicle device.

In summary, through the rich traffic condition information provided by the traffic condition system for Internet of vehicles based on image recognition of the present invention, the driver can make the best driving decision, thereby increasing driving safety. For example, on an ordinary road, the driver can get information about the traffic conditions outside the visible range in front, as well as the possible dynamics of fixed-route vehicles ahead, such as buses, so that the driver can stay aware of the surrounding traffic condition dynamics, and make the driving decisions proactively, rather than reactively. The driver can also use the dynamic prediction mechanism of the backend platform to obtain a reminder in advance of emergency vehicles and avoid potential interference appropriately. In addition, on narrow roads or extremely curvy roads, under conditions of poor visual conditions, drivers can also use dynamic prediction mechanisms to obtain information regarding the encountering of the oncoming cars to avoid inappropriate overtaking decisions.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A traffic condition system for Internet of vehicles based on image recognition, comprising: at least an in-vehicle device and a backend platform;

wherein each in-vehicle device is used for capturing a plurality of traffic condition images, processing the captured traffic condition images to determine traffic condition information, and transmitting the traffic condition information to the backend platform as a raw traffic condition; the backend platform consolidates the raw traffic condition to become a confirmed traffic condition, and the consolidated confirmed traffic condition is forwarded to relevant in-vehicle devices according to a location of each in-vehicle device;

wherein each in-vehicle device further comprises: a visual module for capturing a plurality of traffic condition images, and processing the captured traffic condition images to determine traffic condition information; a vehicle condition module, for providing information comprising: a global positioning system (GPS) positioning, a real-time timestamp, a vehicle speed and other vehicle condition information, best acceleration, deceleration, and average acceleration and deceleration speeds obtained according to the vehicle condition information; an alarm module, for receiving an alarm event and issuing an alarm signal; a device storage module, for storing data of each module in the in-vehicle device; and a control module, respectively connected to the visual module, the vehicle condition module, the alarm module, and the device storage module, and used to control operation of the in-vehicle device and data transmission with the backend platform; and the backend platform comprising: a data transmission module, for providing required data according to requests from a plurality of in-vehicle devices; a traffic condition processing module, for receiving and processing each raw traffic condition filed by each in-vehicle device, and transmitting the confirmed traffic condition to the in-vehicle devices according to the GPS positioning of each in-vehicle device; and a platform storage module, for storing data of each module of the backend platform.

2. The traffic condition system for Internet of vehicles based on image recognition as claimed in claim 1, wherein the visual module further comprises:
   an image capture unit for capturing a series of continuous images;
   a real-time image analysis and traffic condition information identification unit, connected to the image capture unit and used to receive and analyze the captured continuous images to identify the traffic condition information contained in the captured continuous images; and
   a traffic condition filing unit, connected to the real-time image analysis and traffic condition information identification unit and used to confirm the identified traffic condition information.

3. The traffic condition system for Internet of vehicles based on image recognition as claimed in claim 1, wherein the vehicle condition module further comprises:
   a GPS unit, for providing a GPS positioning;
   a clock unit, for providing a real-time timestamp;
   at least a sensor unit, for providing at least a piece of vehicle condition information;
      wherein the vehicle condition information comprises at least vehicle speed information; and
   a vehicle condition analysis unit, for analyzing the vehicle condition information, calculating and obtaining driving information, wherein the driving information comprises: an optimal acceleration speed, an optimal deceleration speed and an average acceleration speed and an average deceleration speed of the vehicle, and the driving information is stored in the device storage module of the in-vehicle device.

4. The traffic condition system for Internet of vehicles based on image recognition as claimed in claim 1, wherein the alarm module further comprises at least an audio alarm unit, a visual alarm unit, or any combination thereof and the alarm module is used to receive an alarm event and issue an alarm signal, which is a sound alarm signal, an image alarm signal, or any combination thereof.

5. The traffic condition system for Internet of vehicles based on image recognition as claimed in claim 1, wherein the device storage module stores at least a confirmed traffic map, route and stop data of a fixed-route vehicle, and location information of an emergency vehicle; and the location information of the emergency vehicle is a dynamic non-detectable information in the in-vehicle device.

6. The traffic condition system for Internet of vehicles based on image recognition as claimed in claim 1, wherein the control module further comprises:
   an event handling unit, connected to the visual module to receive and process data request events from the visual module, and traffic condition filing events;
   a traffic condition handling unit, connected to the event handling unit, the vehicle condition module, the alarm module and the device storage module to receive traffic conditions and decide whether to transmit an alarm event to the alarm module; and
   a data gateway unit, connected to the event handling unit and the device storage module, for communicating data with the backend platform to respond to the data request events with data.

7. The traffic condition system for Internet of vehicles based on image recognition as claimed in claim 1, wherein the data transmission module further comprises:
   a data request receiving unit, for receiving data request from each in-vehicle device;
   a data request handling unit, connected to the data request receiving unit, for processing the data request; and
   a data relay unit, connected to the data request handling unit to provide the data to each in-vehicle device.

8. The traffic condition system for Internet of vehicles based on image recognition as claimed in claim 1, wherein the traffic condition processing module further comprises:
   a traffic condition consolidation unit, for receiving each traffic condition filed from each in-vehicle device, and consolidating the filed traffic condition with each raw traffic condition stored in a raw traffic condition map stored in the platform storage module;
   a traffic condition location prediction unit, connected to the traffic condition consolidation unit, for predicting possible locations of the traffic condition at different future times;
   a raw traffic condition map update unit, connected to the traffic condition location prediction unit, for updating the predicted possible future location of the traffic condition on the raw traffic condition map;
   a traffic condition confidence measurement unit, connected to the raw traffic condition map update unit to calculate a confidence level of each raw traffic condition; and
   a confirmed traffic condition map update unit, connected to the traffic condition confidence measurement unit, for updating a new traffic condition for the raw traffic condition that has the confidence level above a threshold to a confirmed traffic condition map; and
   a traffic condition relay unit, connected to the confirmed traffic condition map update unit, for transmitting traffic conditions in the confirmed traffic condition map to each relevant in-vehicle device according to the GPS positioning of each in-vehicle device.

9. The traffic condition system for Internet of vehicles based on image recognition as claimed in claim 8, wherein the traffic conditions predicted by the traffic condition location prediction unit comprise static traffic conditions and dynamic traffic conditions, and both are processed by the traffic condition location prediction unit and then sent to the raw traffic condition map update unit.

10. The traffic condition system for Internet of vehicles based on image recognition as claimed in claim 9, wherein a static traffic condition predicted by the traffic condition location prediction unit is a special case of a dynamic traffic condition, and a predicted future position of the static traffic condition is set to an initial position of the traffic condition.

11. The traffic condition system for Internet of vehicles based on image recognition as claimed in claim 8, wherein the platform storage module stores at least the raw traffic condition map and the confirmed traffic condition map, respectively comprising each raw traffic condition and each confirmed traffic condition.

12. The traffic condition system for Internet of vehicles based on image recognition as claimed in claim 9, wherein the platform storage module stores at least a fixed-route vehicle's route and stop data, and at least a historical prediction condition of a dynamic traffic condition, all used by the traffic condition location prediction unit.

13. The traffic condition system for Internet of vehicles based on image recognition as claimed in claim 12, wherein the dynamic traffic conditions comprise an emergency vehicle position, a bicyclist position, and a gravel truck position, and the historical prediction condition comprises emergency vehicle speed per hour on a specific road section.

14. The traffic condition system for Internet of vehicles based on image recognition as claimed in claim 2, wherein when the in-vehicle device recognizes a fixed-route vehicle in front, the real-time image analysis and traffic condition information identification unit informs the traffic condition filing unit of the fixed-route vehicle, and then the traffic condition filing unit of the in-vehicle device uses a route number plate or license plate of the fixed-route vehicle, and refers to own current position and related data to identify a driving route of the fixed-route vehicle, and then obtains information about the driving route, so as to warn a driver of the in-vehicle device of possible movements of the fixed-route vehicle accordingly.

15. The traffic condition system for Internet of vehicles based on image recognition as claimed in claim 6, wherein the traffic condition handling unit of the in-vehicle device calculates an optimal time to alarm based on vehicle condition information and driving environment provided by the vehicle condition module, and the vehicle condition information comprises at least best acceleration and deceleration speeds, and average acceleration and deceleration speeds; the vehicle condition information is obtained from GPS positioning information, accelerometer, on-board diagnostics (OBD) information, sensors, or a combination of thereof, and the best acceleration and deceleration speeds are obtained by analyzing vehicle speed and related sensing for a continuous period of time; and based on the driving environment, whether currently driving in uphill or downhill sections of a road, and a lane currently in, a deceleration speed parameter is modified as a minimum time required for the vehicle to slow down to a complete stop to calculate the optimal time to alert the driver.

16. The traffic condition system for Internet of vehicles based on image recognition as claimed in claim 8, wherein a traffic condition record is denoted by a triple $(T, \chi, \Gamma)$, where $\Gamma$ denotes the expiration time of the traffic condition record, $\Gamma = T + \mathcal{O}$, $\mathcal{O}$ denotes a valid duration, M is a maximum number of valid traffic condition records used to calculate the confidence level every time; for time point T, let N be the total number of traffic condition records, m=min {M, n}, where n is the number of valid traffic condition records (n≤N), and let $(T1, \chi 1, \Gamma 1), (T2, \chi 2, \Gamma 2) \ldots (Tm, \chi m, \Gamma m)$ denote the latest m traffic condition records;

a confidence level of the traffic accident traffic condition at time T can be defined as conf in the following formula:
when N>1, $$conf = \frac{1}{m}\sum_{j=1}^{m} \chi_j \frac{\Gamma_j - T}{O'}$$

$$= \frac{1}{m}\sum_{j=1}^{m} \chi_j \frac{(T_j + O') - T}{O'}$$

$$= \frac{1}{m}\sum_{j=1}^{m} \chi_j \left(1 - \frac{T - T_j}{O'}\right)$$

otherwise, conf=0.1;
wherein, when $\mathcal{O} = \infty$, $$conf = \frac{1}{m}\sum_{j=1}^{m} \chi_j.$$

17. The traffic condition system for Internet of vehicles based on image recognition as claimed in claim 1, further comprising: at least a third-party traffic condition data interface unit to receive traffic condition information from a third party and other traffic condition information on a public transport data exchange (PTX).

18. The traffic condition system for Internet of vehicles based on image recognition as claimed in claim 17, wherein the third-party traffic condition data interface unit is disposed at the backend platform.

19. The traffic condition system for Internet of vehicles based on image recognition as claimed in claim 17, wherein the third-party traffic condition data interface unit is disposed at the in-vehicle device.

* * * * *